United States Patent Office 2,848,451
Patented Aug. 19, 1958

2,848,451

POLYETHOXAMERS OF NOVEL QUATERNARY AMMONIUM SALTS AND METHOD FOR PREPARING THE SAME

Walter H. Schuller, Delray Beach, Fla., assignor to American Cyanamid Company, New York, N. Y., a corporation of Maine No Drawing. Application May 22, 1957
Serial No. 660,744

5 Claims. (Cl. 260—249.9)

This invention relates to novel quaternary ammonium salts and to a method for their preparation. More specifically, it relates to the polyethoxamer of N-(2-hydroxyethyl) - N - (4 - amino - 6 - anilino - s - triazinylmethyl)-N,N-dimethylammonium chloride represented by the formula:

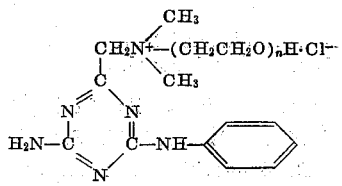

where $n$ is a whole number of from 4 to 50.

The new class of compounds are characterized as colorless solids which are soluble in both organic polar solvents and water. This class of water-soluble compounds is highly desirable since they are utilized as used in an aqueous treating bath to impart antistatic properties to a synthetic textile fabric, such as for example the polyamides as nylon, the polyesters as acrilan, and the acrylics as Creslan.

According to the present invention, the class of compounds above defined may be prepared by causing one equivalent of N-4-amino-6-anilino-s-triazinylmethyl)-N-(2-hydroxyethyl)-N,N-dimethylammonium chloride to react with at least three equivalents of ethylene oxide at temperatures in the range of from about 50° C. to about 125° C. The reaction is preferably conducted in the presence of an alcoholic base, such as for example (a) sodium hydroxide dissolved in isopropanol or (b) a mixture of sodium hydroxide and a tertiary amine such as triethylamine dissolved in secondary butyl alcohol.

Although the reaction will be described with respect to N - (4 - amino - 6 - anilino - s - triazinylmethyl) - N - (2-hydroxyethyl)-N,N-dimethylammonium chloride reactant, it is to be understood that other guanamine-type quaternary ammonium salts may be similarly used. These are, for example, the corresponding bromide, iodide, dihydrogen phosphate, nitrate and monohydrogen sulfate as well as the N-(4,6-diamino-s-triazinylmethyl)-N-(2 - hydroxyethyl) - N,N-dimethylammonium chloride, bromide, phosphate or nitrate.

Surprisingly, the quaternary amine salt will react with at least three to about fifty or more equivalents of ethylene oxide so as to effect reaction on the two-position of the quanamine molecule to the exclusion of the four or six position thereof. Moreover, where the length of the poylglycol chain is increased, the resultant derivative exhibits greater water solubility. This is a highly desirable property for the reason that the guanamine derivative is to be subsequently dissolved in water.

As previously stated, the reaction is advantageously carried out in the presence of an alcoholic basic menstruum. It has been found that a tertiary amine such as triethylamine dissolved in secondary butanol is particularly effective as a solvent medium in that reaction proceeds with ease. Other alcoholic bases, such as sodium hydroxide in isopropanol, are however less desirable, since the time of reaction is considerably increased. In general, the reaction may be completed in from two to twenty-four hours depending upon the solvent medium and the number of polyethenoxy groups desired in the final product. For example, it has been found that it requires approximately four to ten hours to effect reaction in an equal mixture of an alkali metal hydroxide and a trialkylamine in an alcoholic medium while employing some seven to ten ethylene oxide equivalents per equivalent of guanamine quaternary ammonium salt, whereas the time for effecting the same reaction is more than doubled where an alkali-metal-alcoholic medium is used alone. In general, it is advantageous to employ from about 10 to about 25 mole percent of a base, based on the quaternary salt used.

In my copending application for Letters Patent, Serial No. 660,745 filed on even date, there is described a method for preparing the guanamine quaternary ammonium salt employed in the present invention. As stated therein, the process involves the reaction of an N-phenyl biguanide and ethyl chloroacetate in molar excess at a temperature of from about 50° C. to 70° C. whereby N-phenyl-α-chloroacetoguanamine is recovered. The latter is next reacted at an average temperature of 85° C. with dimethyl-2-hydroxyethylamine to obtain N-(4-amino - 6 - anilino - s - triazinylmethyl) - N - (2 - hydroxyethyl) - N,N - dimethylammonium chloride.

To facilitate a clearer understanding of the invention, the following examples are provided which are to be taken as merely illustrative. Unless otherwise stated, all parts are by weight.

*Example 1*

32.5 parts of N-(4-amino-6-anilino-s-triazinylmethyl)-N-(2-hydroxyethyl)-N,N-dimethylammonium chloride (0.1 mole) is dissolved in 70 parts of secondary butanol in the presence of 1.1 milliliters of a 40% aqueous solution of sodium hydroxide (15 mole percent based on the quaternary salt) and 7.6 milliliters triethylamine (15 mole percent based on the quaternary salt). 50 parts of ethylene oxide is then added over a six and one-half hour period at a reaction temperature of about 90° C.–92° C. Heating is continued for an additional hour to insure completion of reaction. The mixture is next weighed. The increase in weight of the reaction mixture indicates that approximately 37 parts of ethylene oxide (about 8 equivalents) has reacted. The reaction mixture is vacuum stripped at 21 mm. Hg pressure and a temperature of about 90° C. and 74 parts of residue is recovered. The residue is the polyethoxamer of N-(2-hydroxyethyl)-N - (4 - amino - 6 - anilino - s - triazinylmethyl) - N,N - dimethylammonium chloride which is capable of representation as follows:

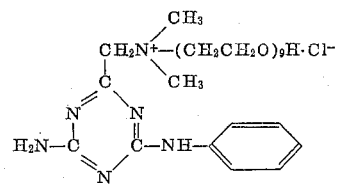

In the above example, the number of polyethyleneoxy groups may be increased or decreased as desired by controlling the introduction of ethylene oxide. Thus, for example, as few as four and as many as fifty ethyleneoxy groups may be introduced into the basic guanamine quaternary ammonium molecule.

It is a feature of the invention that the polyethoxamers described impart durable antistatic properties to textiles after several repeated washings. It is an advantage that the compounds herein described are water soluble at least to the extent that workable aqueous solutions can be prepared. The following example is provided to demonstrate this feature.

*Example 2*

To 95 parts of water is added 5 parts of the polyethoxamer as prepared in Example 1 above. A 9" x 9" sheet of nylon is next immersed in the solution, passed through squeeze rollers and then oven-dried to remove all residual moisture. The dried sheet is folded over twice in the same direction to obtain a sheet measuring 2¼" x 9". A charge is induced on the sheet by stroking the same with a glass rod for 15 minutes. The sheet is now exposed to carbon particles that are placed on a table by holding the sheet above the particles. If the sheet can be placed close to the latter particles without attracting them, the sheet is said to be antistatic. In the present instance, even at substantially zero distance, that is, where the sheet is placed immediately above the particles, no attraction is noted. After four successive washes, the sheet possesses the same antistatic properties, indicating the durability of the polyethoxamer.

Where the antistatic agent is not employed, the untreated cloth becomes quickly charged upon stroking as evidenced by carbon particle attraction at a two inch distance.

I claim:

1. As a new composition: a N-(2-hydroxyethyl)-N-(4 - amino - 6 - anilino - s - triazinylmethyl) - N,N - dimethylammonium chloride represented by the general formula:

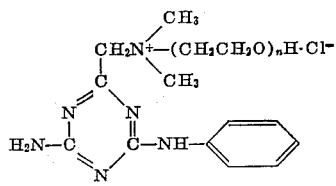

in which $n$ is an integer from about 4 to about 50.

2. As a new composition, the product of claim 1 in which $n$ is nine.

3. A process for preparing the N-(2-hydroxyethyl)-N-(4 - amino - 6 - anilino - s - triazinylmethyl) - N,N - dimethylammonium chloride which comprises the steps of: reacting at elevated temperatures in the range of from about 50° C. to 125° C. one equivalent of N-(4-amino-6-anilino - s - triazinylmethyl) - N - (2 - hydroxyethyl) - N,N-dimethylammonium chloride with from about four to about fifty equivalents of ethylene oxide in the presence of an alcoholic solvent comprising an equal mixture of an alkali metal hydroxide and triethylamine.

4. A process according to claim 3 in which the alkali metal hydroxide and the tert-alkyl amine are sodium hydroxide.

5. A process according to claim 4 in which the alcoholic solvent is secondary butanol.

References Cited in the file of this patent
UNITED STATES PATENTS
2,719,156     De Benneville _____ Sept. 27, 1955